United States Patent [15] 3,693,225
Wildhaber [45] Sept. 26, 1972

[54] ROTARY CUTTER FOR CUTTING TEETH

[72] Inventor: Ernest Wildhaber, 124 Summit Drive, Rochester, N.Y. 14620

[22] Filed: March 16, 1971

[21] Appl. No.: 124,729

[52] U.S. Cl. ....................29/103 R, 29/105 R, 90/1.6
[51] Int. Cl. ................................................B26d 1/00
[58] Field of Search .............29/103 R, 105 R; 90/1.6

[56] References Cited

UNITED STATES PATENTS 2,315,147 3/1943 Wildhaber ...............29/105 X
2,932,239 4/1960 Wildhaber ...............29/105 X

*Primary Examiner*—Leonidas Vlachos
*Attorney*—B. Edward Shlesinger

[57] ABSTRACT

These rotary cutters for cutting teeth in rotating cylindrical workpieces contain cutting teeth inclined to the peripheral direction of the cutter and arranged in two or more circles about the cutter axis. Said circles have different positions axially of the cutter. Each of said circles contains identical cutting teeth different from the cutting teeth of the other circles. Preferably the cutting teeth extend lengthwise at a constant distance from the cutter axis, along helices.

14 Claims, 8 Drawing Figures

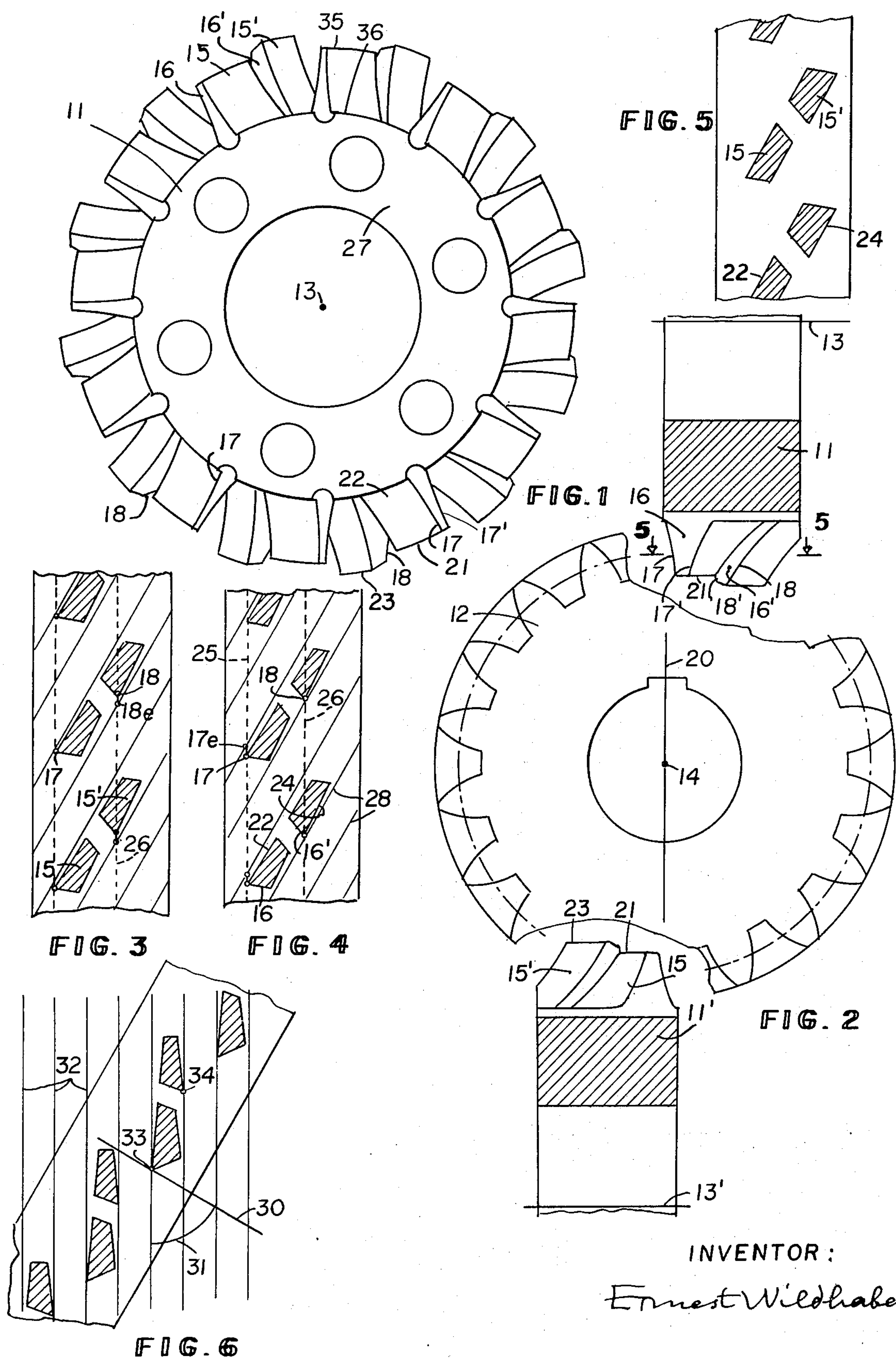
INVENTOR:
Ernest Wildhaber

INVENTOR:

Ernest Wildhaber

ROTARY CUTTER FOR CUTTING TEETH

The present invention relates to cutters for cutting teeth of gears, rotors and the like on cylindrical blanks. They turn in time with the workpiece, and their cutting teeth are inclined to the peripheral direction of the cutter. They differ from hobs in that they contain cutting edges each adapted to contact the entire or most of the working depth of a tooth surface, so that their cutting facets extend all the way or most of the way from the tooth bottom to the tooth top. Thus comparatively few cutting teeth are needed while high efficiency may be obtained by use of angles in excess of forty five degrees between the axes of the cutter and workpiece. These cutters have a combined forming and generating action.

The cutters of the present invention contain cutting teeth arranged in two or more circles about the cutter axis, said cutting teeth of a circle having the same position axially of the cutter.

One object of the present invention is to improve the cutting efficiency. Another object is to attain a better surface finish than attainable with hobs.

A further object is to provide cutters of this character that can be sharpened by regrinding their cutting faces while retaining the capacity to reproduce exactly the same tooth shape. A further aim is to provide timed cutters of this character that contain different cutting teeth for the opposite sides of the teeth to be cut, so that each cutting tooth can be given a cutting face most favorable to the tooth side to be cut. A further object is to provide a pair of cutters for simultaneous operation on a workpiece, containing rough-cutting teeth and separate finish-cutting teeth adapted to operate in one feed direction and in the return feed respectively.

Other objects will appear in the course of the specification and in the recital of the appended claims.

The invention will be described with the drawings, in which

FIG. 1 is an axial view of a cutter constructed according to the present invention.

FIG. 2 is a view looking axially of a helical gear cut with a pair of cutters of this character, shown in cutting position. The cutters have axes in the drawing plane and are shown in axial section, with the cutting teeth turned up into the drawing plane, to clearly show the helical cutting teeth. These appear as if for a very large cutter diameter.

FIGS. 3 and 4 are fragmentary developments, to a plane, of the cylindrical pitch surface of the gear of FIG. 2, showing in section the cutting teeth of the two cutters respectively.

FIG. 5 is a fragmentary development into a plane of a cylindrical section coaxial with the cutter and taken along lines 5—5 of FIG. 2.

FIG. 6 is a fragmentary development of the pitch surface of a spur gear with straight teeth, showing the cutting teeth engaging it.

Figure 7:
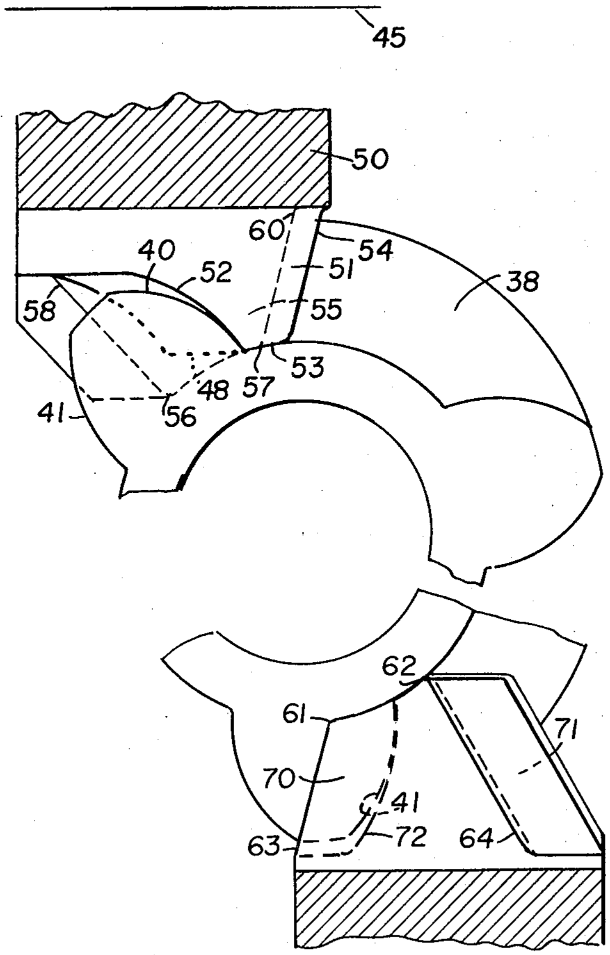
FIG. 7 is a fragmentary axial view of a helical rotor such as may be used for compressors, shown in engagement with a pair of cutters constructed according to the invention.

The cutter 11 shown in FIGS. 1 to 5 is a gear cutter. It can operate as a single cutter, or as one of a pair of cutters 11, 11′ operating simultaneously on a helical gear 12. The axis 13 of cutter 11, as well as axis 13′ of cutter 11′ lie in the drawing plane of FIG. 2, and are at right angles to the direction of axis 14 of gear 12. More broadly the cutter axes include an angle preferably larger than 45 degrees with the direction of the work axis 14. And the cutters and the workpiece are fed relative to one another at an angle to the cutter axis and at least approximately in the direction of the axis of the workpiece.

Cutting edges are formed on the cutting teeth 15, 15′ by cutting faces 16, 16′.

The front cutting teeth 15 are identical and lie on a circle (25, FIG. 4) coaxial with the cutter. They have equal positions axially of the cutter. Their cutting edges lie on a surface of revolution coaxial with the cutter. Likewise the cutting teeth 15′ are identical among themselves and they lie on another circle (26, FIGS. 3 and 4) coaxial with the cutter. The cutting teeth 15′ differ in shape from the cutting teeth 15. Both have concavely curved cutting edges 17, 18. The concave shape is due principally to the large angle included between the directions of the cutter and workpiece axes, an angle preferably larger than 45 degrees. It is a right angle in FIG. 2.

Cutter 11′ is similar to cutter 11 and may be identical therewith. The two cutters are set on opposite sides of center line 20, so that cutting clearance is obtained from their position. The cutting teeth 15 extend lengthwise along helices 21, at a constant distance from the cutter axis 13. Their side surfaces are helical surfaces of constant lead, that extend helically about the cutter axis. Likewise the cutting teeth 15′, that follow the cutting teeth 15, extend along helices 23 at a constant distance from the cutter axis. And their side surfaces 24 are helical surfaces of constant lead.

The tooth shape produced depends both on the shape of the cutting edge and on the cutter diameter. The described provision permits to resharpen the cutter by regrinding its cutting faces 16, 16′, whereupon the cutter is advanced axially to the initial position of the cutting edges and acts like the new cutter. It continues to produce exactly the same shape. This is of great value. In addition the helical shape is easier to produce accurately than the more conventional shape.

While the shape of the cutting edges can be computed, it can also be produced mechanically, by first cutting a wormgear coaxial with the cutter and fully conjugate to the workpiece that contains helical or straight teeth. Its tooth number equals the number of the cutting teeth per circle. The wormgear teeth are gashed so that one side of the gashes contains the cutting faces desired on the cutter. The intersection of these cutting faces with the tooth sides produces the cutting edges required on the cutter. The lead of the helical sides of the cutting teeth is made such that cutting clearance is provided on the cutting teeth. It can be formed on the wormgear by removing stock back of the cutting edge, increasingly with increasing distance from the cutting edge.

Instead of cutting teeth 15, 15′ formed integral with the circular body portion 27, inserted cutting teeth or blades may be used if desired, or cutting teeth formed on a segment secured to the cutter body. Also the cutter may be made up of two or more circular bodies with cutting teeth, all rigidly secured together. The cutting teeth may be of any suitable material known for cutting, such as for instance high-speed steel, tungsten carbide and others.

The cutting teeth illustrated in FIGS. 1 to 5 are shown with cutting faces 16, 16' suitable for instance for high-speed steel. They provide an acute cutting angle, the angle included with the helix direction, the direction of the straight lines 28 shown in FIGS. 3 and 4. Lines 28 are the pitch helices of the gear to be cut, developed into a plane. Other angles may be provided between the cutting faces and the helix direction, when desired. Thus tungsten carbide cutters may require somewhat obtuse cutting angles.

The pair of identical cutters shown in FIGS. 3 and 4 respectively are in position for a roughing cut, such as a cut from the solid blank. This cut is preferably done with the cutter being fed relatively to the blank in the direction of the cutting motion at the workpiece. Edges 17, FIG. 3 and edges 18, FIG. 4 rough out opposite tooth sides, while edges 18, FIG. 3 and edges 17, FIG. 4 are kept away from the tooth sides worked on, as shown, and saved for finishing. After roughing is completed the cutters are turned slightly on their axes, to move the edges 18, FIG. 3 and 17, FIG. 4 to finishing positions **18*e* and 17*e*** respectively. Finishing is then performed during the return feed, while the cutters continue to turn in the same direction. This cut is known as a climb cut, the cutters being fed relatively to the workpiece in a direction opposite to the cutting direction. In this way the workpiece may be roughed and finished in a single operation, while preserving the finishing edges.

It should be understood, however, that single cutters of the described character may also be used, rather than cutter pairs, depending also on the machines available. In this case a separate roughing cut preferably precedes the finishing operation except for small sizes.

While the cutting teeth of FIGS. 3 and 4 are shown relieved relatively to the workpiece, relief being obtained by the offset position of the cutters, FIG. 5 shows a cylindrical section coaxial with the cutter, after development to a plane. Here the cutting teeth may keep the same thickness from front to rear.

FIG. 6 illustrates the cutting of a spur gear with straight teeth that extend parallel to its axis. The cutter axis 30 is inclined at an acute angle 31 to the direction of the work axis that coincides with the direction of the gear pitch lines 32. A finishing cut with a single cutter is shown, the cutting edges 33, 34 intersecting the pitch lines 32.

The cutters of the invention may be of general disk type, and in all cases the top 35 of their cutting teeth has a larger distance from the cutter axis 13 than their base 36, where they rise from the cutter body. The cutting teeth 15, 15' are arranged in two circles respectively about the cutter axis, the cutting teeth 15' of the rear circle (26) projecting to a larger distance from the cutter axis 13 than the cutting teeth 15 of the front circle (25). The side surfaces 22, 24 (FIG. 4) or all side surfaces of the cutting teeth are helical surfaces of the same lead. Opposite side edges 17, 17' and 18, 18' (FIG. 2) are unequally inclined to the radial direction of the cutter. Likewise opposite side profiles of the cutting teeth 15, 15', in planes perpendicular to the cutter axis, are also unequally inclined to the radial direction of the cutter.

Figure 8:
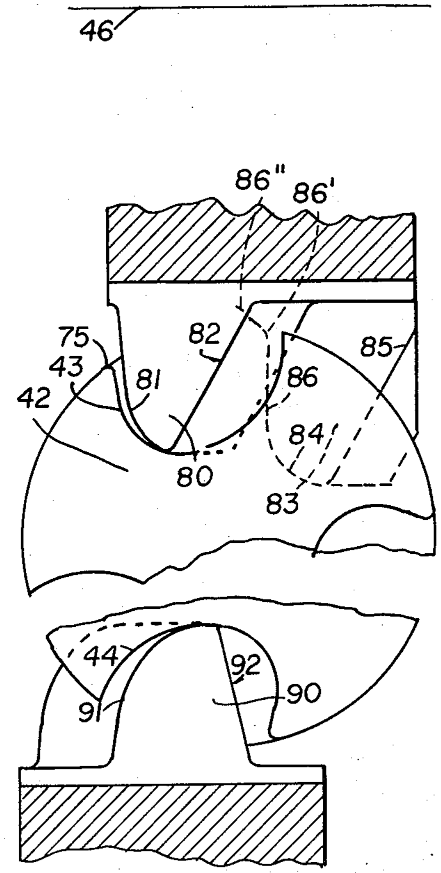
FIG. 8 is a similar view showing the mate to the helical rotor of FIG. 7, shown in engagement with a pair of cutters.

FIGS. 7 and 8 illustrate cutters for producing helical teeth or threads on compressor rotors. FIG. 7 shows a left hand rotor 38 with convex profiles 40, 41 in planes perpendicular to the rotor axis, while FIG. 8 shows a mating right hand rotor 42 with concave profiles 43, 44. Each is shown in engagement with a pair of cutters. However single cutters could also be used. For convenience of illustration the cutter axes 45, 45' and 46, 46' are shown close to the cutting teeth, much approached thereto as compared with their actual position.

Cutter 50 (FIG. 7) contains a plurality of cutting teeth 51 of equal axial position, lying on a circle coaxial with the cutter. They extend lengthwise at a constant distance from the cutter axis 45, along helices 48 coaxial with the cutter. The cutting teeth are shown turned up into the drawing plane, to more clearly bring out their helical nature. Concavely curved cutting edge 52 is adapted to contact an entire line of the adjacent final tooth-side surface as it rotates about the cutter axis in time with the rotation of the workpiece 38.

Edge portion 53 cuts a small part of the tooth bottom, while edge 54 opposite to edge 52 does not leave any mark on the completed teeth. A cutting tooth 55 follows cutting tooth 51 and passes through the same tooth space immediately after cutting tooth 51. It contains a bottom-cutting edge 56–57 and supporting edges 56–58 and 57–60. These supporting edges do not leave any mark on the completed teeth. It should be noted that on this side a tooth with bottom-cutting edge follows the tooth 51 with side-cutting edge 52. It is back of it. This is the side where a plane perpendicular to the cutter axis would produce a very acute cutting angle on cutting tooth 51.

On the opposite side, FIG. 7 below, a bottom-cutting edge portion 61–62 of a cutting tooth 70 precedes the cutting tooth 71 with side-cutting edge 72. Edge portion 61–62 of cutting tooth 70 is supported by side portions 61–63 and 62–64 that do not leave any mark on the completed tooth surfaces. At tooth 71 a plane perpendicular to the cutter axis 45' would produce a very obtuse cutting angle. Cutting teeth 70, 71 extend longitudinally at a constant distance from the cutter axis 45'.

The bottom-cutting edges 56–57 and 61–62 efficiently remove stock from the wide tooth bottom. With coarse pitches I preferably use a roughing operation ahead of a separate finishing operation.

On the cutters for the mating rotor, FIG. 8, the cutting teeth are also arranged in circles about the cutter axis. Cutting tooth 80 with side-cutting edge 81 and supporting edge 82 is followed by a cutting tooth 83 having a bottom-cutting edge 84 and side edges 85 and 86, 86', 86''. Side edges 82 and 85 leave no mark on the completed teeth. Curved side-edge portion 86' and its elongation 86'' however produce the rounded portion 75 and blend it into the outside surface of the rotor 42. Cutting tooth 83 enters the same tooth space of the workpiece immediately after cutting tooth 80.

Cutting tooth 90 of the lower cutter contains a side-cutting edge 91 that produces the side surface with profile 44. It also contains a supporting edge 92 that leaves no mark on the completed workpiece. Cutting teeth 90 are also arranged in a circle about the cutter axis; and they extend lengthwise at a constant distance from the axis 46' of their cutter.

While the invention has been described with several embodiments thereof, further modifications may be made therein without departing from its spirit, by applying the common knowledge and practice in the art to which the invention pertains. For definition of its scope it is relied on the appended claims.

What I claim is:

1. A rotary cutter for cutting teeth on rotating cylindrical blanks in a feed motion at an angle to its axis, comprising a circular body portion cutting teeth projecting outwardly from said body portion so that the top of said cutting teeth has a larger distance from the cutter axis than their base, said cutting teeth being arranged in a plurality of circles about the cutter axis and being inclined to the peripheral direction of the cutter, said circles having different positions axially of the cutter, each of said circles containing identical cutting teeth differing from the cutting teeth of the other circles, at least one of said circles containing cutting teeth with curved cutting edges.

2. A rotary cutter according to claim 1, whereon at least one of said circles contains cutting teeth with concavely curved cutting edges.

3. A rotary cutter according to claim 1, whereon the cutting teeth are arranged in two circles only about the cutter axis.

4. A rotary cutter according to claim 1, whereon all the cutting teeth of a circle are identical.

5. A rotary cutter for cutting teeth on rotating cylindrical blanks in a feed motion at an angle to its axis, comprising a circular body portion, cutting teeth projecting outwardly from said body portion so that the top of said cutting teeth has a larger distance from the cutter axis than their base, said cutting teeth extending lengthwise at a constant distance from the cutter axis and being arranged in a plurality of circles about the cutter axis, said circles having different positions axially of the cutter, each of said circles containing identical cutting teeth different from the other cutting teeth of said cutter, the cutting teeth of at least one of said circles having curved cutting edges.

6. A rotary cutter according to claim 5, wherein said equal cutting teeth extend along helices at a constant distance from the cutter axis and have helical side surfaces.

7. A rotary cutter according to claim 5, where on two adjacent circles the cutting teeth of the rear circle project to a larger distance from the cutter axis than the cutting teeth of the front circle.

8. A rotary cutter according to claim 5, wheron the cutting teeth of the plurality of circles contain helical side surfaces of the same lead.

9. A rotary cutter according to claim 5, whereon at least one of said circles contains cutting teeth with concavely curved cutting edges.

10. A rotary cutter according to claim 5, where on at least one of said circles opposite side surfaces of said cutting teeth have profiles unequally inclined to the radial direction in planes perpendicular to the cutter axis.

11. A rotary cutter according to claim 1, where a cutting tooth with bottom-cutting edge follows a cutting tooth with side-cutting edge.

12. A rotary cutter according to claim 11, whereon curved side-cutting edges are provided only on the side where a plane perpendicular to the cutter axis would produce an acute cutting angle on the cutting teeth.

13. A rotary cutter according to claim 1, whereon a cutting tooth with bottom-cutting edge precedes a cutting tooth with side-cutting edge.

14. A rotary cutter according to claim 13, whereon curved side-cutting edges are provided only on the side where a plane perpendicular to the cutter axis would produce an obtuse cutting angle on the cutting teeth.

* * * * *